(12) United States Patent
Manolakos et al.

(10) Patent No.: US 11,917,492 B2
(45) Date of Patent: Feb. 27, 2024

(54) HIERARCHICAL REPORTING OF LOCATION ASSISTANCE INFORMATION FOR POSITIONING REFERENCE SIGNAL (PRS) RESOURCES IN A MULTI-BEAM USER EQUIPMENT-BASED POSITIONING SCENARIO

(71) Applicant: QUALCOMM Incorporated, San Diego, CA (US)

(72) Inventors: Alexandros Manolakos, Escondido, CA (US); Guttorm Ringstad Opshaug, Redwood City, CA (US); Sony Akkarakaran, Poway, CA (US); Sven Fischer, Nuremberg (DE); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/820,195

(22) Filed: Aug. 16, 2022

(65) Prior Publication Data
US 2022/0394432 A1 Dec. 8, 2022

Related U.S. Application Data

(63) Continuation of application No. 16/927,401, filed on Jul. 13, 2020, now Pat. No. 11,451,928.

(30) Foreign Application Priority Data

Aug. 14, 2019 (GR) .............................. 20190100360

(51) Int. Cl.
*H04W 8/00* (2009.01)
*H04W 4/029* (2018.01)
(Continued)

(52) U.S. Cl.
CPC ........... *H04W 4/029* (2018.02); *G01S 5/0289* (2013.01); *G01S 5/14* (2013.01)

(58) Field of Classification Search
CPC ....... H04W 4/02; H04W 4/029; H04W 48/12; H04W 48/16
(Continued)

(56) References Cited

U.S. PATENT DOCUMENTS 8,619,140 B2 12/2013 Brown et al.
9,344,248 B2 5/2016 Krishnamurthy et al.
(Continued)

OTHER PUBLICATIONS

International Search Report and Written Opinion—PCT/US2020/041975—ISAEPO—dated Dec. 14, 2020.
(Continued)

*Primary Examiner* — Joseph Arevalo
(74) *Attorney, Agent, or Firm* — Muncy, Geissler, Olds & Lowe, P.C./Qualcomm

(57) ABSTRACT

Disclosed are techniques for wireless communication. In an aspect, a user equipment (UE) receives assistance data for enabling the UE to estimate a location of the UE, the assistance data including a relative location of each of a plurality of transmission points, wherein the relative location is represented as a hierarchy of two or more levels of description, wherein a highest level of description is relative to a fixed reference point, receives, from each of at least a subset of the plurality of transmission points, at least one positioning reference signal, and estimates the location of the UE based on characteristics of reception of the at least one positioning reference signal from each of the subset of the plurality of transmission points and the two or more levels of description and the fixed reference point for each of the subset of the plurality of transmission points.

27 Claims, 13 Drawing Sheets

(51) Int. Cl.
*G01S 5/14* (2006.01)
*G01S 5/02* (2010.01)

(58) Field of Classification Search
USPC ........ 455/457, 456.1, 456.3, 404.2, 62, 101, 455/272, 269, 562.1, 12.1, 433
See application file for complete search history.

(56) References Cited

U.S. PATENT DOCUMENTS

| | | | |
|---|---|---|---|
| 9,702,963 B2* | 7/2017 | Kalliola | G01S 13/931 |
| 9,736,629 B2 | 8/2017 | Woo et al. | |
| 9,763,043 B2 | 9/2017 | Larsen | |
| 9,807,560 B2 | 10/2017 | Rehnberg et al. | |
| 9,877,299 B2 | 1/2018 | Smith | |
| 10,291,419 B2* | 5/2019 | Jose | G01S 5/02 |
| 10,310,051 B2 | 6/2019 | Kim et al. | |
| 11,217,037 B2 | 1/2022 | Yousun et al. | |
| 2013/0002479 A1* | 1/2013 | Pratt | G01S 19/40 342/357.25 |
| 2013/0002480 A1* | 1/2013 | Pratt | G01S 19/42 342/357.25 |
| 2014/0176366 A1 | 6/2014 | Fischer et al. | |
| 2014/0280246 A1 | 9/2014 | Riggs et al. | |
| 2015/0004997 A1 | 1/2015 | Gao et al. | |
| 2016/0066147 A1 | 3/2016 | Venkatraman et al. | |
| 2017/0111880 A1 | 4/2017 | Park et al. | |
| 2018/0020421 A1 | 1/2018 | Kumar et al. | |
| 2018/0020423 A1 | 1/2018 | Wang et al. | |
| 2018/0335502 A1* | 11/2018 | Lowe | G01S 11/16 |
| 2019/0149228 A1* | 5/2019 | Ziskind | G01S 19/41 455/12.1 |
| 2019/0182665 A1* | 6/2019 | Edge | H04W 74/08 |
| 2019/0187236 A1* | 6/2019 | Ylamurto | G01S 13/878 |
| 2019/0187298 A1* | 6/2019 | Grgich | G01S 19/40 |
| 2020/0058169 A1 | 2/2020 | Friesenhahn et al. | |
| 2020/0110151 A1* | 4/2020 | Manolakos | G01S 5/10 |
| 2020/0320776 A1 | 10/2020 | Doyle et al. | |
| 2020/0379958 A1* | 12/2020 | Riggs | G06F 16/2358 |
| 2021/0001981 A1 | 1/2021 | Ihalainen et al. | |
| 2021/0034796 A1* | 2/2021 | Santarone | G06Q 99/00 |
| 2021/0049630 A1 | 2/2021 | Kawasaki et al. | |
| 2021/0049828 A1 | 2/2021 | Park et al. | |
| 2021/0051442 A1 | 2/2021 | Manolakos et al. | |
| 2021/0063526 A1 | 3/2021 | Aasen et al. | |
| 2021/0410103 A1* | 12/2021 | Zhang | H04L 5/0078 |
| 2022/0138280 A1* | 5/2022 | Riggs | G06Q 40/06 707/737 |

OTHER PUBLICATIONS

Partial International Search Report—PCT/US2020/041975—ISA/EPO—dated Oct. 20, 2020.
Qualcomm Incorporated: "Assistance Data for DL-Only UE-Based Mode", 3GPP Draft, 3GPP TSG-RAN WG2 Meeting #107, R2-1909424_(Assistance Data for UE-Based), 3rd Generation Partnership Project (3GPP), Mobile Competence Centre, 650, Route Des Lucioles, F-06921 Sophia-Antipolis Cedex, France, vol. RAN WG2, No. Prague, CZ, Aug. 26, 2019-Aug. 30, 2019, Aug. 16, 2019, (Aug. 16, 2019), XP051767224, 15 pages, Retrieved from the Internet: URL: http://www.3gpp.org/ftp/tsg_ran/WG2_RL2/TSGR2_107/Docs/R2-1909424.zip. [retrieved on Aug. 16, 2019] figure 2 sections: 2. Discussion 3. Position calculation assistance data 4.1 LPP Assistance Data Transfer, the whole document.
Woo H., et al., "A Hierarchical Location Service Architecture for VANET with Aggregated Location Update", Computer Communications, vol. 125, Jul. 2018, pp. 38-55, ISSN 0140-3664, https://www.sciencedirect.com/science/article/abs/pii/S0140366416306922.
European Search Report—EP23171714—Search Authority—Munich—dated Jul. 25, 2023.
Taiwan Search Report—TW109123774—TIPO—dated Nov. 10, 2023.

* cited by examiner

HIERARCHICAL REPORTING OF LOCATION ASSISTANCE INFORMATION FOR POSITIONING REFERENCE SIGNAL (PRS) RESOURCES IN A MULTI-BEAM USER EQUIPMENT-BASED POSITIONING SCENARIO

CROSS-REFERENCE TO RELATED APPLICATION

The present Application for Patent is a continuation of U.S. patent application Ser. No. 16/927,401, entitled "HIERARCHICAL REPORTING OF LOCATION ASSISTANCE INFORMATION FOR POSITIONING REFERENCE SIGNAL (PRS) RESOURCES IN A MULTI-BEAM USER EQUIPMENT-BASED POSITIONING SCENARIO," filed Jul. 13, 2020, which claims priority under 35 U.S.C. § 119 to Greek Patent Application No. 20190100360, entitled "HIERARCHICAL REPORTING OF LOCATION ASSISTANCE INFORMATION FOR POSITIONING REFERENCE SIGNAL (PRS) RESOURCES IN A MULTI-BEAM USER EQUIPMENT-BASED POSITIONING SCENARIO," filed Aug. 14, 2019, each of which is assigned to the assignee hereof, and expressly incorporated herein by reference in its entirety.

BACKGROUND OF THE DISCLOSURE

1. Field of the Disclosure

Aspects of the disclosure relate generally to wireless communications and the like.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a user equipment (UE) includes a memory, at least one transceiver, and at least one processor communicatively coupled to the memory and the at least one transceiver, the at least one processor configured to: receive, from a positioning entity via the at least one transceiver, assistance data for enabling the UE to estimate a location of the UE, the assistance data including a relative location of each of a plurality of transmission points, wherein the relative location of each of the plurality of transmission points is represented as a hierarchy of two or more levels of description, wherein a lower level of description is relative to a higher level of description, and wherein a highest level of description is relative to a fixed reference point, receive, via the at least one transceiver, from each of at least a subset of the plurality of transmission points, at least one positioning reference signal, and estimate the location of the UE based on characteristics of reception of the at least one positioning reference signal from each of the subset of the plurality of transmission points and the two or more levels of description and the fixed reference point for each of the subset of the plurality of transmission points.

In an aspect, a positioning entity includes a memory, at least one transceiver, and at least one processor communicatively coupled to the memory and the at least one transceiver, the at least one processor configured to: cause the at least one transceiver to transmit assistance data for enabling a UE to estimate a location of the UE, the assistance data including a relative location of each of a plurality of transmission points, wherein the relative location of each of the plurality of transmission points is represented as a hierarchy of two or more levels of description, wherein a lower level of description is relative to a higher level of description, and wherein a highest level of description is relative to a fixed reference point.

In an aspect, a method of wireless communication performed by a UE includes receiving, from a positioning entity, assistance data for enabling the UE to estimate a location of the UE, the assistance data including a relative location of each of a plurality of transmission points, wherein the relative location of each of the plurality of transmission points is represented as a hierarchy of two or more levels of description, wherein a lower level of description is relative to a higher level of description, and wherein a highest level of description is relative to a fixed reference point, receiving, from each of at least a subset of the plurality of transmission points, at least one positioning reference signal, and estimating the location of the UE based on characteristics of reception of the at least one positioning reference signal from each of the subset of the plurality of transmission points and the two or more levels of description and the fixed reference point for each of the subset of the plurality of transmission points.

In an aspect, a method of wireless communication performed by a positioning entity includes transmitting assistance data for enabling a UE to estimate a location of the UE, the assistance data including a relative location of each of a plurality of transmission points, wherein the relative location of each of the plurality of transmission points is represented as a hierarchy of two or more levels of description, wherein a lower level of description is relative to a higher level of description, and wherein a highest level of description is relative to a fixed reference point. In an aspect, a UE includes means for receiving, from a positioning entity, assistance data for enabling the UE to estimate a location of the UE, the assistance data including a relative location of each of a plurality of transmission points, wherein the relative location of each of the plurality of transmission points is represented as a hierarchy of two or more levels of description, wherein a lower level of description is relative to a higher level of description, and wherein a highest level of description is relative to a fixed reference point, means for receiving, from each of at least a subset of the plurality of transmission points, at least one positioning reference signal, and means for estimating the location of the UE based on characteristics of reception of the at least one positioning reference signal from each of the subset of the plurality of transmission points and the two or more levels of description and the fixed reference point for each of the subset of the plurality of transmission points.

In an aspect, a positioning entity includes means for transmitting assistance data for enabling a UE to estimate a location of the UE, the assistance data including a relative location of each of a plurality of transmission points, wherein the relative location of each of the plurality of transmission points is represented as a hierarchy of two or more levels of description, wherein a lower level of description is relative to a higher level of description, and wherein a highest level of description is relative to a fixed reference point.

In an aspect, a non-transitory computer-readable medium storing computer-executable instructions includes computer-executable instructions comprising: at least one instruction instructing a UE to receive, from a positioning entity, assistance data for enabling the UE to estimate a location of the UE, the assistance data including a relative location of each of a plurality of transmission points, wherein the relative location of each of the plurality of transmission points is represented as a hierarchy of two or more levels of description, wherein a lower level of description is relative to a higher level of description, and wherein a highest level of description is relative to a fixed reference point, at least one instruction instructing the UE to receive, from each of at least a subset of the plurality of transmission points, at least one positioning reference signal, and at least one instruction instructing the UE to estimate the location of the UE based on characteristics of reception of the at least one positioning reference signal from each of the subset of the plurality of transmission points and the two or more levels of description and the fixed reference point for each of the subset of the plurality of transmission points.

In an aspect, a non-transitory computer-readable medium storing computer-executable instructions includes computer-executable instructions comprising: at least one instruction instructing a positioning entity to transmit assistance data for enabling a user equipment (UE) to estimate a location of the UE, the assistance data including a relative location of each of a plurality of transmission points, wherein the relative location of each of the plurality of transmission points is represented as a hierarchy of two or more levels of description, wherein a lower level of description is relative to a higher level of description, and wherein a highest level of description is relative to a fixed reference point.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
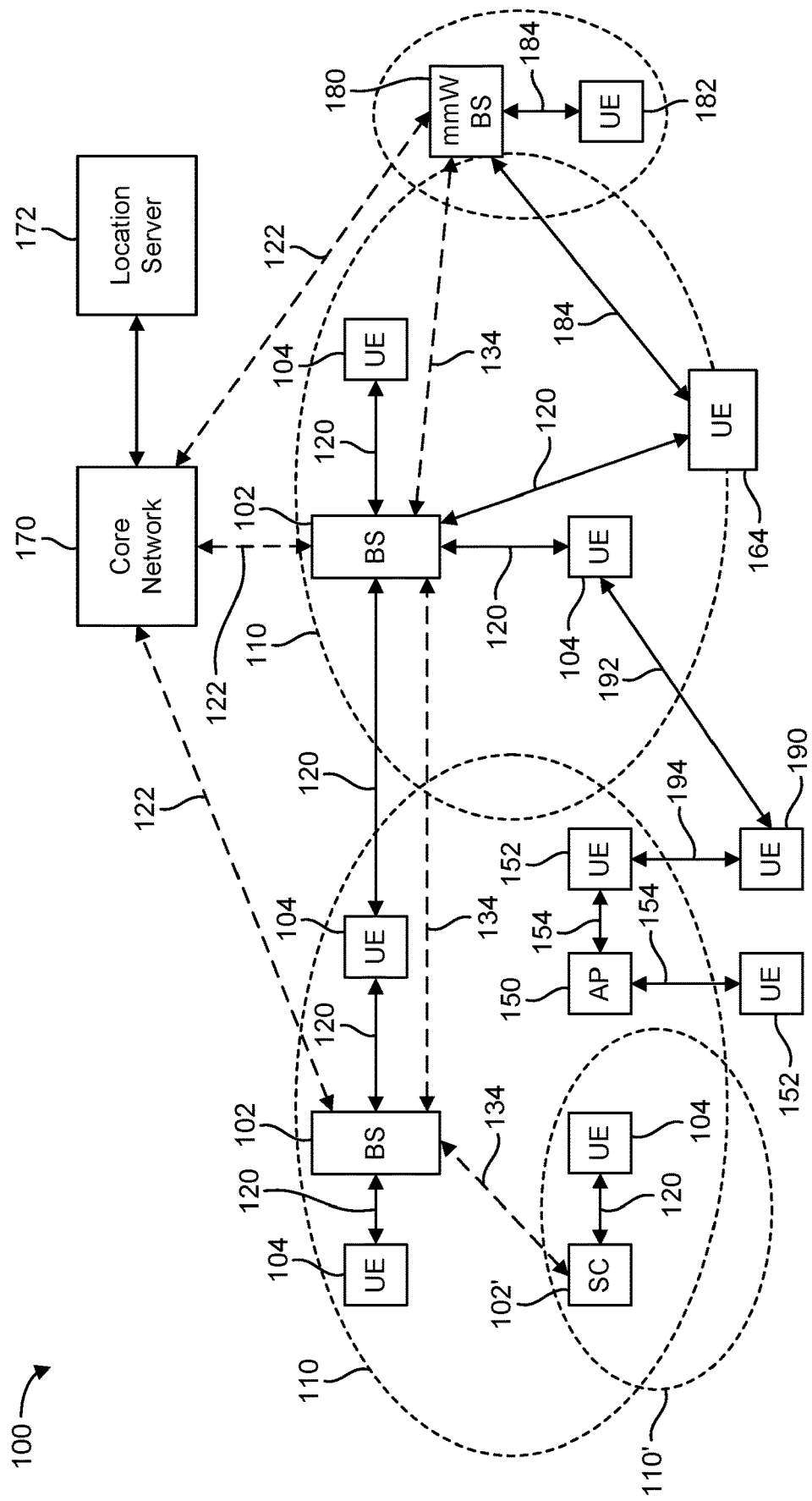
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations 102 may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter (mm) wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 mm and 10 mm. Radio waves in this band may be referred to as a millimeter wave. Near mmW may extend down to a frequency of 3 GHz with a wavelength of 100 mm. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
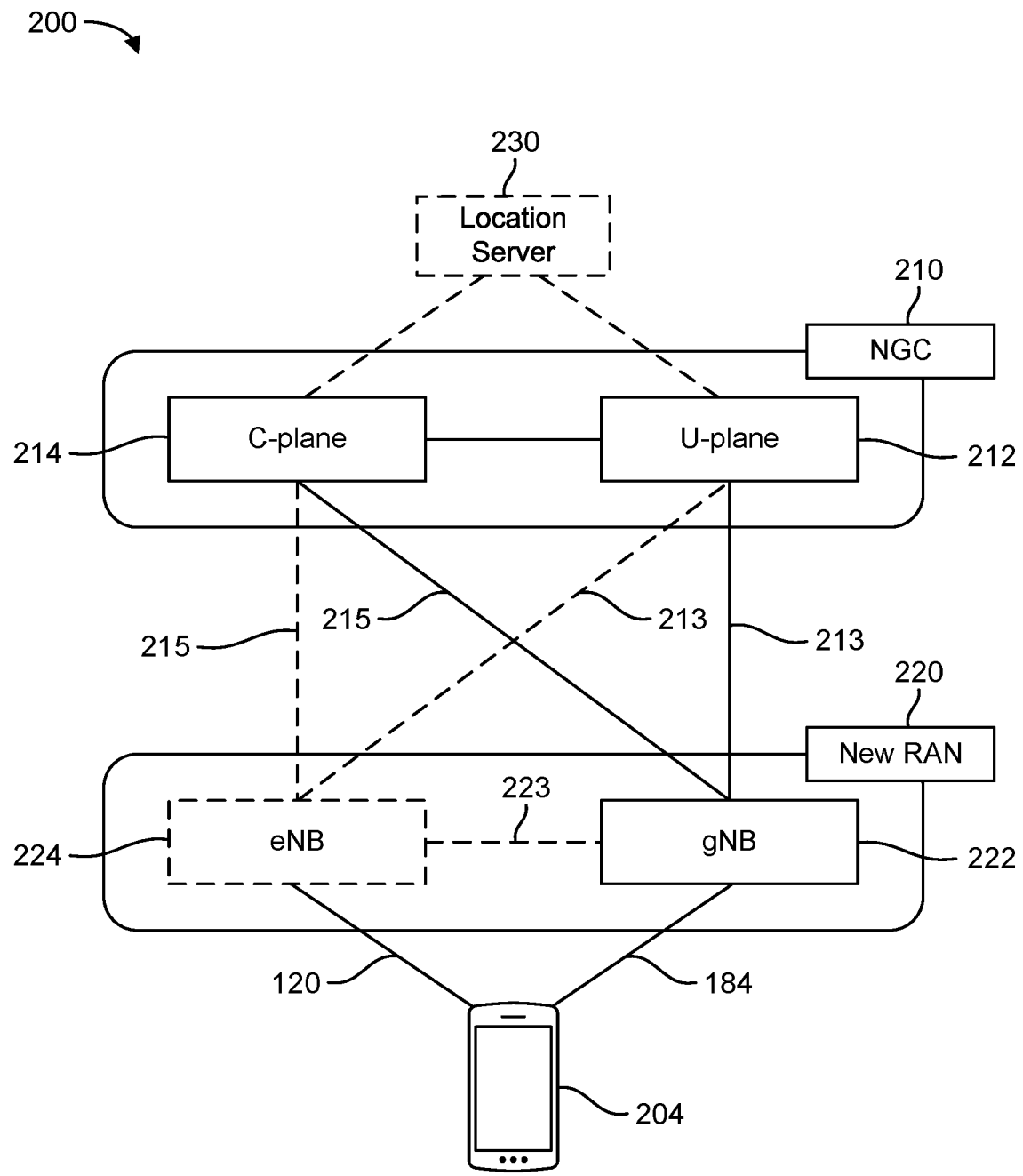
FIGS. 2A and 2B illustrate example wireless network structures, according to various aspects of the disclosure.

According to various aspects, FIG. 2A illustrates an exemplary wireless network structure 200. For example, an NGC 210 (also referred to as a "5GC") can be viewed functionally as control plane functions (C-plane) 214 (e.g., UE registration, authentication, network access, gateway selection, etc.) and user plane functions (U-plane) 212 (e.g., UE gateway function, access to data networks, IP routing, etc.), which operate cooperatively to form the core network. User plane interface (NG-U) 213 and control plane interface (NG-C) 215 connect the gNB 222 to the NGC 210 and specifically to the user plane functions 212 and control plane functions 214, respectively. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
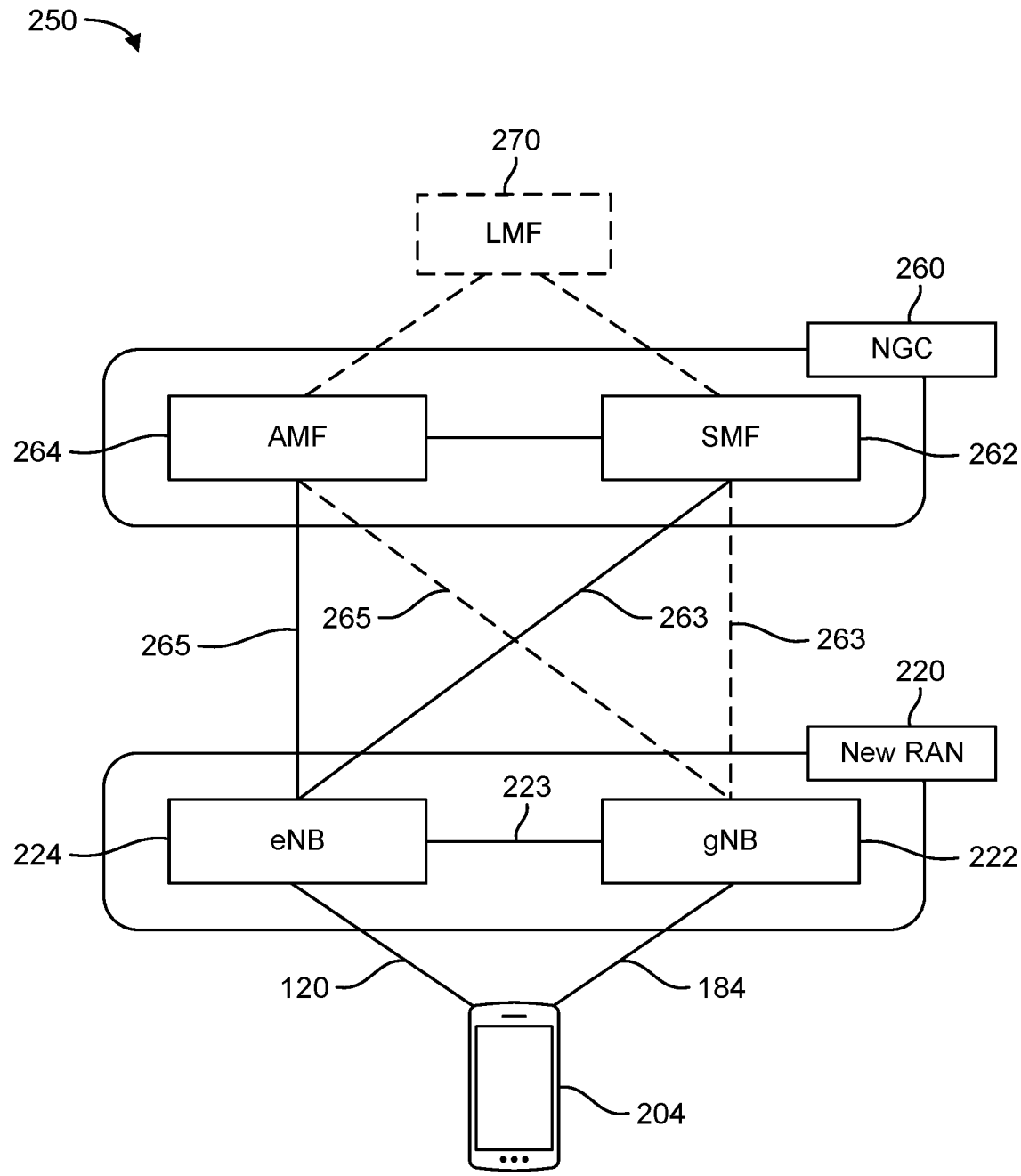

According to various aspects, FIG. 2B illustrates another exemplary wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), uplink traffic verification (service data flow (SDF) to QoS flow mapping), transport level packet marking in the uplink and downlink, downlink packet buffering and downlink data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
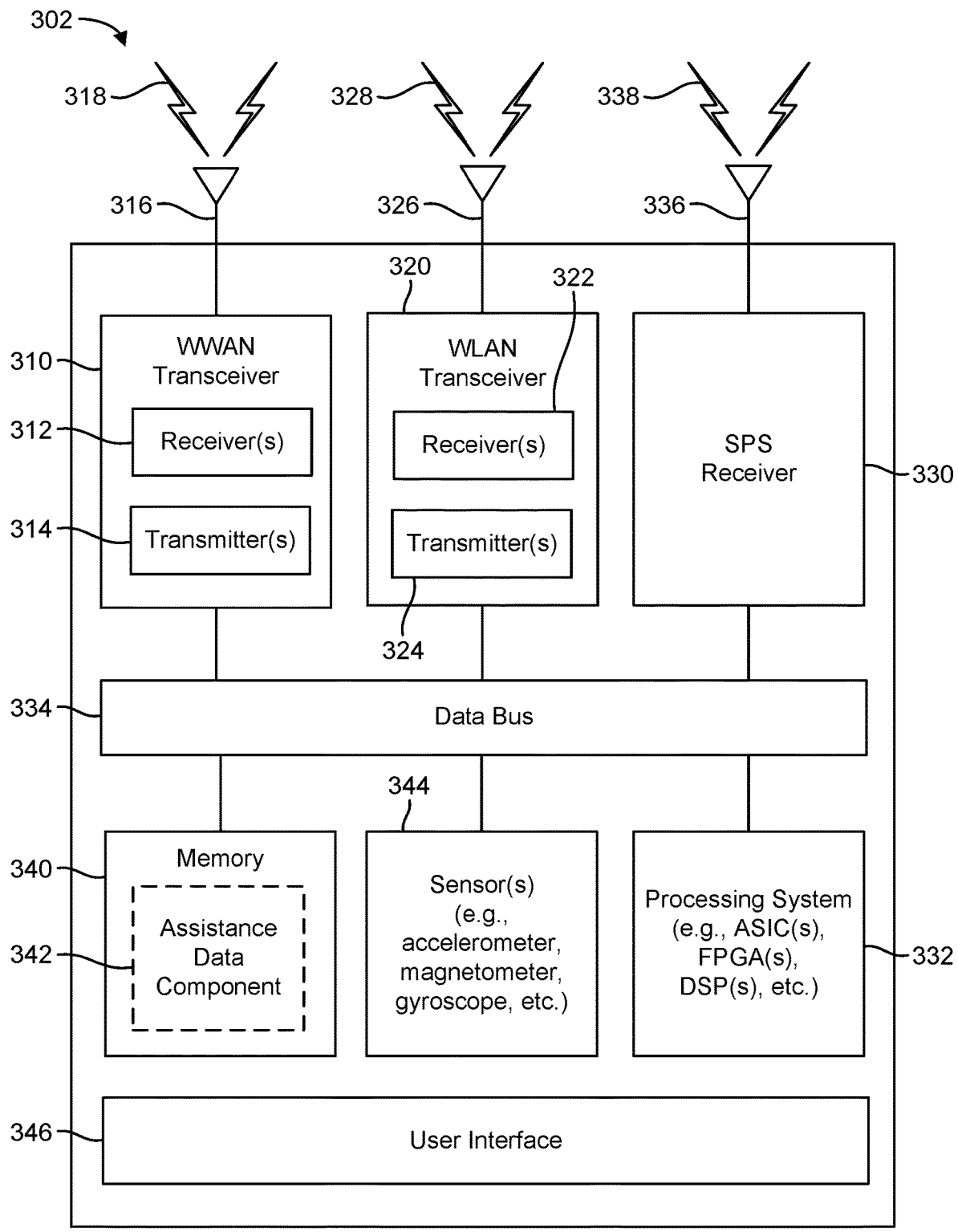
FIGS. 3A to 3C are simplified block diagrams of several sample aspects of components that may be employed in wireless communication nodes and configured to support communication as taught herein.
Figure 3B:
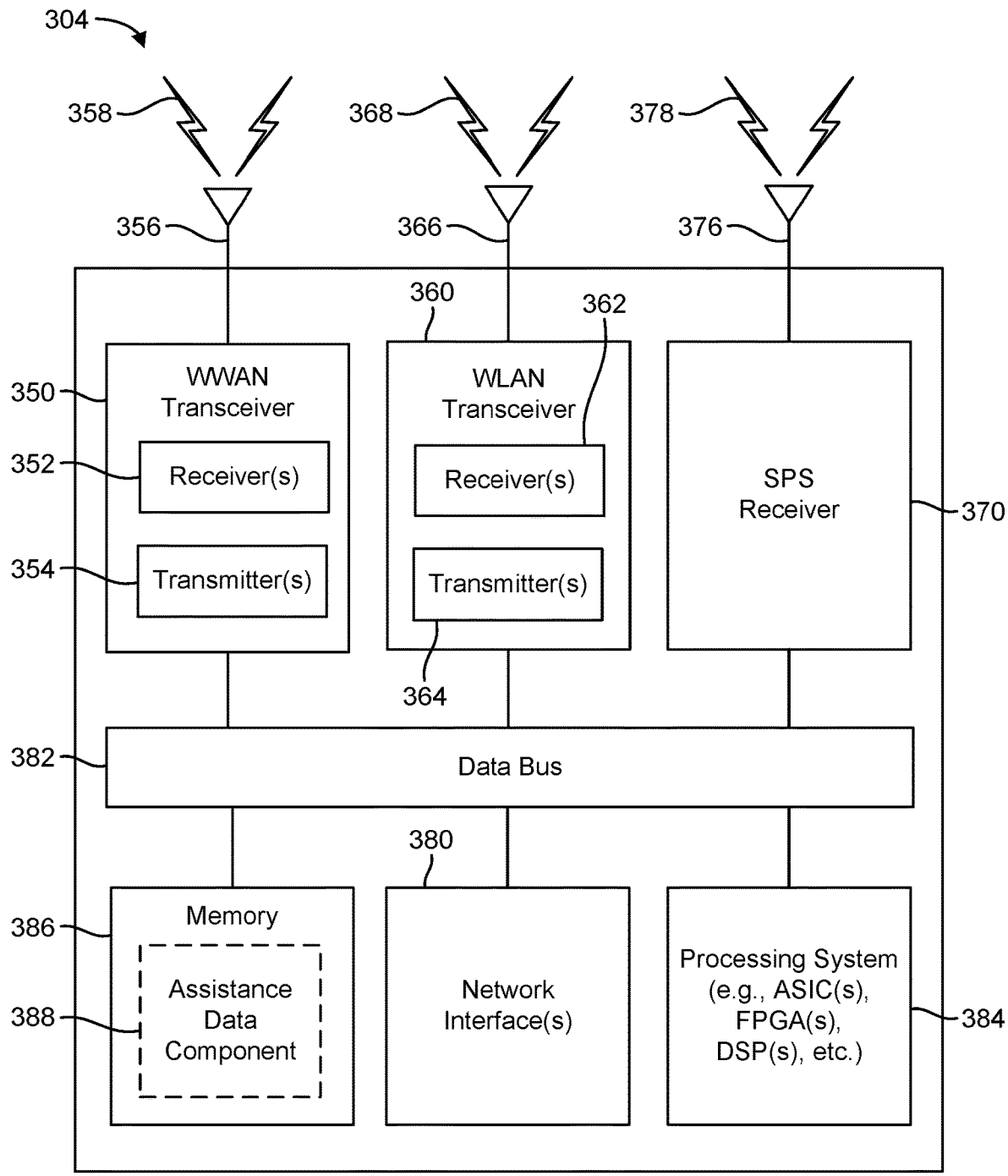
Figure 3C:
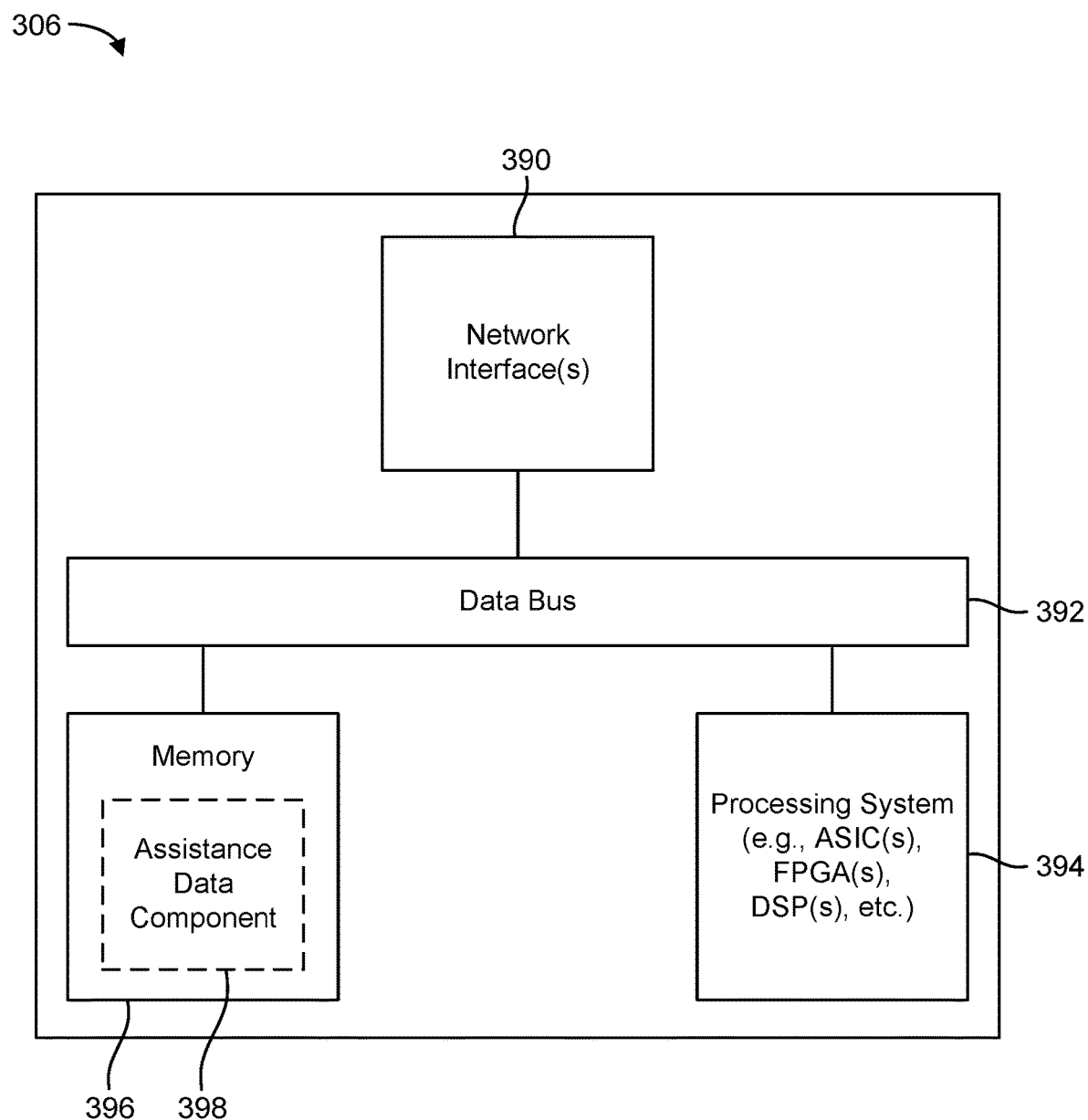

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, hierarchical assistance data reception and decoding, and for providing other processing functionality. The base station 304 includes a processing system 384 for providing functionality relating to, for example, providing hierarchical assistance data as disclosed herein, and for providing other processing functionality. The network entity 306 includes a processing system 394 for providing functionality relating to, for example, providing hierarchical assistance data as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include assistance data components 342, 388, and 398, respectively. The assistance data components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the assistance data components 342, 388, and 398 may be external to the processing systems 332, 384, and 394 (e.g., part of a modem processing system, integrated with another processing system, etc.). Alternatively, the assistance data components 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor.

Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the assistance data components 342, 388, and 398, etc.

Figure 4:
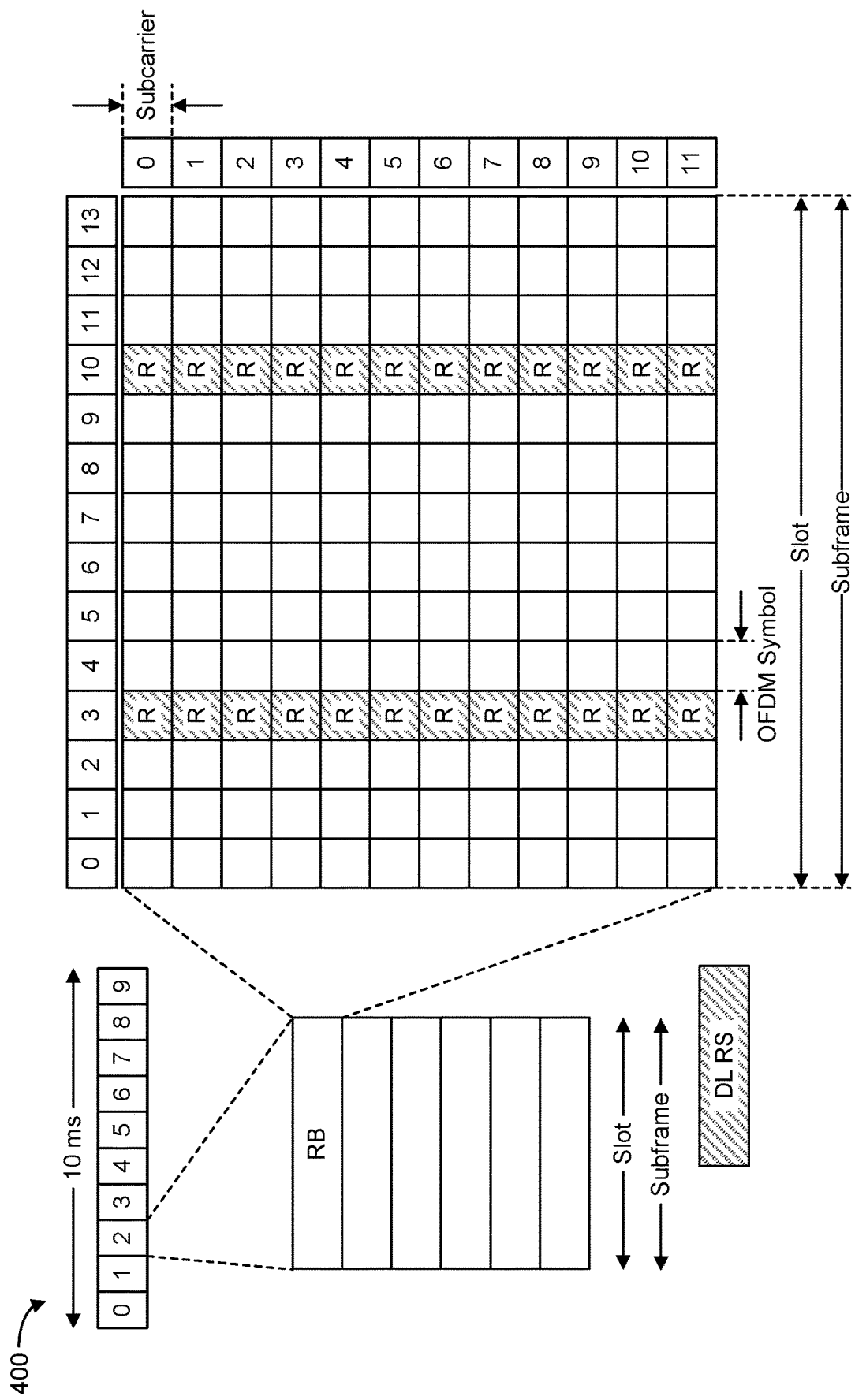
FIG. 4 is a diagram illustrating an example of a frame structure for use in a wireless telecommunications system according to an aspect of the disclosure.

Various frame structures may be used to support downlink and uplink transmissions between network nodes (e.g., base stations and UEs). FIG. 4 is a diagram 400 illustrating an example of a downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (μ), for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Sot | Slots/ Subframe | Slots/ Frame | Slot Duration (ms) | Symbol Duration (μs) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the example of FIG. 4, a numerology of 15 kHz is used. Thus, in the time domain, a frame (e.g., 10 ms) is divided into 10 equally sized subframes of 1 ms each, and each subframe includes one time slot. In FIG. 4, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

As illustrated in FIG. 4, some of the REs carry downlink reference (pilot) signals (DL-RS) for channel estimation at the UE. The DL-RS may include demodulation reference signals (DMRS), channel state information reference signals (CSI-RS), cell-specific reference signals (CRS), positioning reference signals (PRS), navigation reference signals (NRS), tracking reference signals (TRS), etc., exemplary locations of which are labeled "R" in FIG. 4.

A collection of resource elements that are used for transmission of PRS is referred to as a "PRS resource," and may be identified by the parameter DL-PRS-ResourceId. The collection of resource elements (REs) can span multiple PRBs in the frequency domain and N (e.g., 1 or more) consecutive symbol(s) within a slot in the time domain. In a given OFDM symbol in the time domain, a PRS resource occupies consecutive PRBs in the frequency domain.

A "PRS resource set" is a set of PRS resources used for the transmission of PRS signals, where each PRS resource has a PRS resource ID (DL-PRS-ResourceId). In addition, the PRS resources in a PRS resource set are associated with the same TRP. A PRS resource set is identified by a PRS resource set ID (DL-PRS-ResourceSetId) and is associated with a particular TRP (identified by a cell ID). In addition, the PRS resources in a PRS resource set have the same periodicity, a common muting pattern configuration, and the same repetition factor across slots. The periodicity may have a length selected from $2^m \cdot \{4, 5, 8, 10, 16, 20, 32, 40, 64, 80, 160, 320, 640, 1280, 2560, 5120, 10240\}$ slots, with $\mu=0, 1, 2, 3$ (an identifier of the numerology). The repetition factor may have a length selected from $\{1, 2, 4, 6, 8, 16, 32\}$ slots.

A PRS resource ID in a PRS resource set is associated with a single beam (and/or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," or simply an "occasion" or "instance."

A "positioning frequency layer" is a collection of one or more PRS resource sets across one or more TRPs that have the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same value of comb-size. The Point A parameter takes the value of the parameter ARFCN-ValueNR, where "ARFCN" stands for "absolute radio-frequency channel number," and is an identifier/code that specifies a pair of physical radio channel used for transmission and reception. The downlink PRS bandwidth may have a granularity of four PRBs, with a minimum of 24 PRBs and a maximum of 272 PRBs. The comb size indicates the number of subcarriers in each symbol carrying PRS. For example, a comb-size of comb-4 means that every fourth subcarrier of a given symbol carries PRS. Currently, up to four frequency layers have been defined, and up to two PRS resource sets may be configured per TRP per frequency layer.

Downlink PRS resource IDs are locally defined within a downlink PRS resource set, and downlink PRS resource set IDs are locally defined within a TRP. To uniquely identify a DL-PRS resource across TRPs, an ID has been defined that can be associated with multiple downlink PRS resource sets associated with a single TRP. This ID can be used along with a downlink PRS resource set ID and a downlink PRS resource ID to uniquely identify a single downlink PRS resource. This ID is referred to herein as DL-PRS-TRP-ResourceSetId. Each TRP should only be associated with one DL-PRS-TRP-ResourceSetId. For example, a DL-PRS-TRP-ResourceSetId may be a cell ID (e.g., PCI, VCI), or a TRP ID, or another identifier that is different than the cell ID or the TRP ID that is used for positioning purposes to participate in the unique identification of a PRS resource.

Note that the terms "positioning reference signal" and "PRS" may sometimes refer to specific reference signals that are used for positioning in LTE systems. However, as used herein, unless otherwise indicated, the terms "positioning reference signal" and "PRS" refer to any type of reference signal that can be used for positioning, such as but not limited to, PRS signals in LTE, NRS, TRS, CRS, CSI-RS, DMRS, PSS, SSS, etc.

Figure 5:
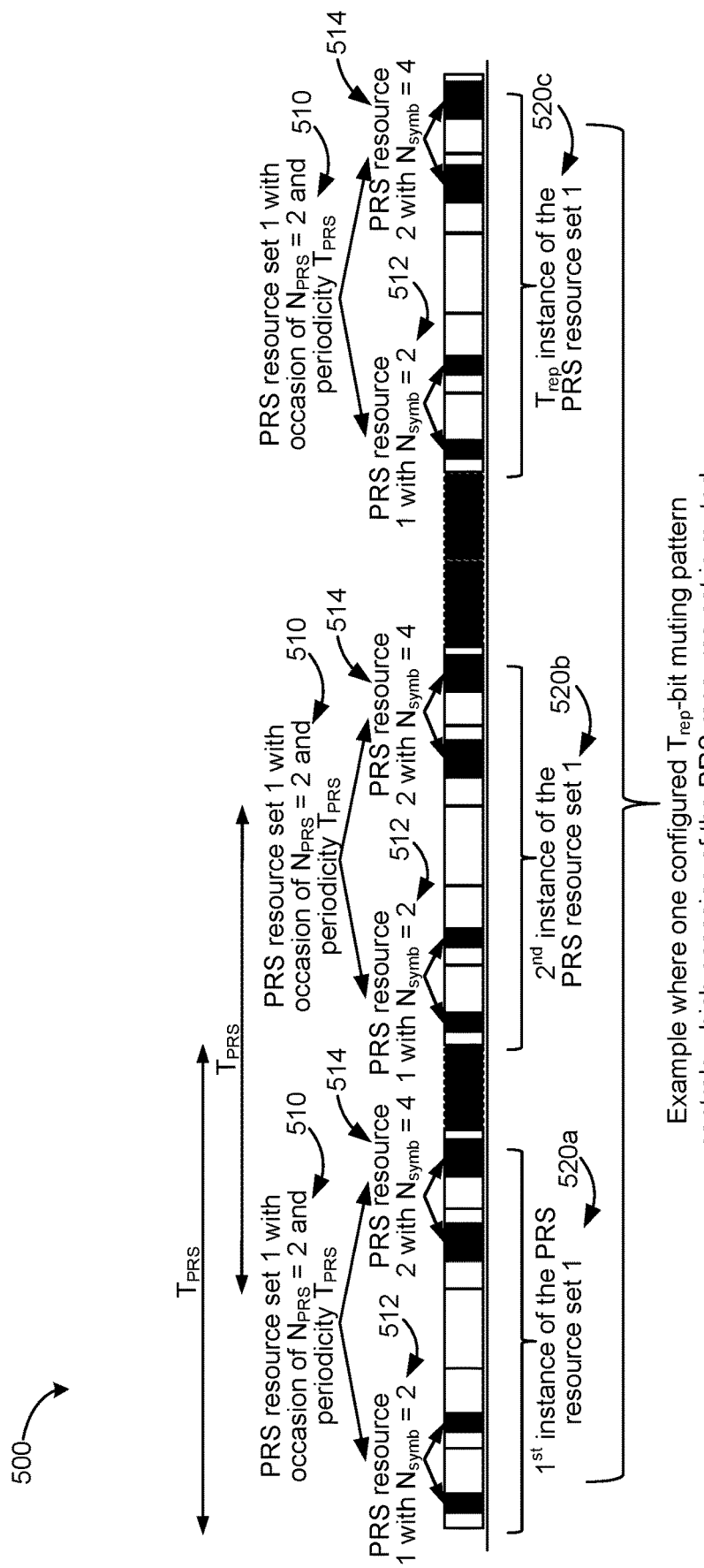
FIG. 5 is a diagram of an exemplary PRS configuration for the PRS transmissions of a given base station, according to aspects of the disclosure.

FIG. 5 is a diagram of an exemplary PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. The PRS configuration 500 identifies the PRS resources 512 and 514 of a PRS resource set 510 over which the base station transmits PRS. The PRS resource set 510 has an occasion length $N_{PRS}$ of two (2) slots and a periodicity of $T_{PRS}$ (e.g., 160 subframes or 160 ms). As such, both the PRS resources 512 and 514 are each two consecutive slots in length and repeat every $T_{PRS}$ subframes, starting from the slot in which the first symbol of the respective PRS resource occurs.

In the example of FIG. 5, the PRS resource set 510 includes two PRS resources, a first PRS resource 512 (labeled "PRS resource 1" in FIG. 5) and a second PRS resource 514 (labeled "PRS resource 2" in FIG. 5). The PRS resource 512 and the PRS resource 514 may be transmitted on separate beams of the same base station. The PRS resource 512 has a symbol length $N_{symb}$ of two (2) symbols, and the PRS resource 514 has a symbol length $N_{symb}$ of four (4) symbols.

Each instance of the PRS resource set 510, illustrated as instances 530a, 530b, and 530c, includes an occasion of length '2' (i.e., $N_{PRS}=2$) for each PRS resource 512, 514 of the PRS resource set. The PRS resources 512 and 514 are repeated every $T_{PRS}$ subframes up to the muting sequence periodicity $T_{REP}$. As such, a bitmap of length $T_{REP}$ would be needed to indicate which occasions of instances 530a, 530b, and 530c are muted.

In an aspect, there may be additional constraints on a PRS configuration, such as PRS configuration 500 illustrated in FIG. 5. For example, for all PRS resources (e.g., PRS resources 512, 514) of a PRS resource set (e.g., PRS resource set 510), the base station (or the location server) can configure the following parameters to be the same: (a) the occasion length (e.g., $T_{PRS}$), (b) the number of symbols (e.g., $N_{symb}$), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

Note that a PRS configuration, as described above, is signaled to the UE to enable the UE to perform PRS positioning measurements. The UE is not expected to blindly perform detection of a PRS configuration. Further, support of numerologies (e.g., the CP length and subcarrier spacing) for downlink PRS is the same as for data transmissions.

In some case, a UE may be able to calculate an estimate its own position, rather than reporting measurements to a positioning entity (e.g., location server 230, LMF 270) and the positioning entity estimating the position of the UE. This is referred to as UE-based positioning. UE-based positioning has a number of advantages: it enables new use cases, enables improved performance of existing use cases, has improved scalability, improved operational range, low uplink overhead, low latency, very low specifications impact, and parity with RAT-independent UE-based features.

For UE-based positioning, the UE needs to know the physical location of the transmission point (e.g., antenna array) from which each beam (PRS resource) is being transmitted. Then, based on the round-trip-time (RTT) between itself and at least three transmission points, or the observed time difference of arrival (OTDOA)/reference signal time difference (RSTD) of reference signals (e.g., PRS) received from pairs of transmission points, the UE can determine the distances between itself and the involved transmission points, and thereby, estimate its position relative to their known positions. However, if the UE only knows the location(s) of the base station(s), and not the locations of the transmission points transmitting the beams, the resulting position estimate will be incorrect. For example, there may be a half meter (m) or more difference between the center of a base station and the antenna array transmitting a beam, which would result in a commensurate error in the location of the UE.

Figure 6:
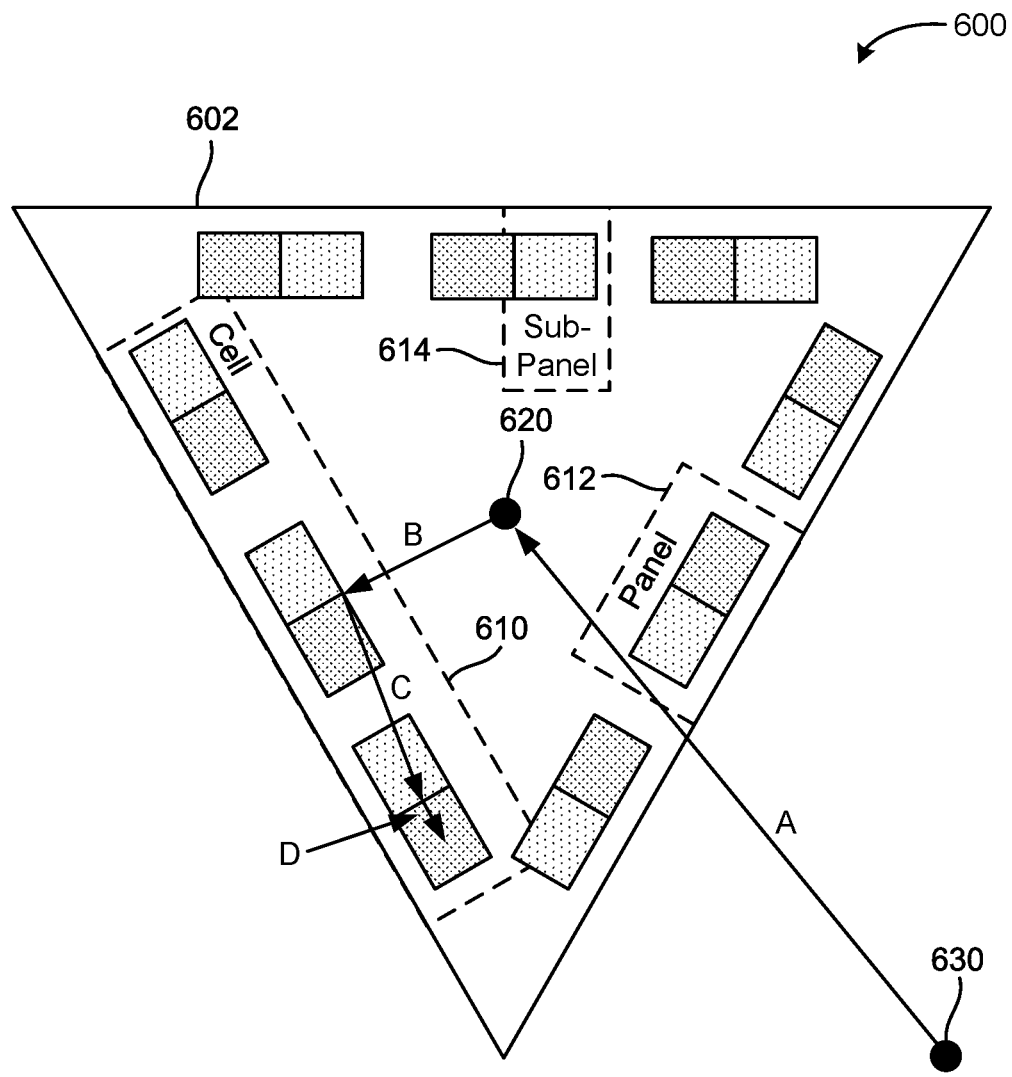
FIG. 6 is a top-view diagram of an exemplary base station 602, according to aspects of the disclosure.

FIG. 6 is a top-view diagram 600 of an exemplary base station 602, according to aspects of the disclosure. In the example of FIG. 6, the base station 602 has three sides, and each side has three antenna panels 612. Each antenna panel 612 is composed of two subpanels 614. The three antenna panels 612 on the side of the base station 602 correspond to a cell 610 of the base station 602. The center of the base station 602 is marked by center point 620. However, the subpanels 614 are the transmission points (e.g., antenna arrays) that transmit beams to the UE. As can be seen, there is some distance between the center point 620 and the center of each panel 612, and again between the center of each panel 612 and the center of each subpanel 614. As such, knowledge of only the location of the center point 620 of the base station 602 would result in an inaccurate position estimate of the UE.

Currently, only cell-level location granularity is available to a UE. Specifically, to identify the location of a cell 610, the location of each cell 610 may be stored as a reference point (e.g., reference point 630) and a relative location (e.g., a vector from the reference point to the center of the cell). This can be provided to the UE as positioning assistance data in the format of, for every cell 610, coordinates of the reference point and a value of the vector from the reference point to the cell 610. Note that currently, even if multiple cells 610 have the same relative locations with respect to different reference points, or difference relative locations with respect to the same reference point, the UE is still provided with the reference point and relative location for each cell 610.

Further, currently, there is no association between a cell 610 and the concept of a PRS resource, a PRS resource set, a beam, or a panel 612. That is, the location of a cell 610 is the finest level of location granularity currently achievable.

As such, there are only two levels of location granularity: the location of the base station 602 and the location of the cell 610. As such, to achieve a higher level of location accuracy, it is necessary to identify the location of the transmission point (e.g., the location of panel 612 and/or subpanel 614) of a transmit beam.

In an aspect, the location of a transmission point (e.g., a subpanel 614) could be given by coordinates in a global coordinate system (GCS). For example, the location could be provided as an ellipsoid point with an altitude and uncertainty ellipsoid (which is used in NR positioning protocol A (NRPPa)). In that case, the latitude resolution (i.e., accuracy) would be within about one meter of the actual latitude, the longitude resolution would be within about two and a half meters of the actual longitude, and the altitude resolution would be within about one meter of the actual location. As another example, the location of a transmission point could be provided as a high-accuracy ellipsoid point with an altitude and uncertainty ellipsoid. This could provide a resolution of approximately 5 mm for latitude, and less than 10 mm for longitude. It also provides a resolution of $2^{-7}$ meters for altitude.

There can be different levels of reporting of the reference transmission point location. As will be appreciated, the high-accuracy ellipsoid approach would use significantly more bits, and therefore, would be difficult to broadcast in the assistance data. As such, it would be beneficial to reduce the overhead of the transmission point location assistance data, without sacrificing accuracy.

A goal of the techniques of the present disclosure is to describe the location of each unique transmission point for DL-PRS with a level of precision that is an order of magnitude better than the expected end-to-end position accuracy requirement. In this way, the precision should have an insignificant impact on the end-to-end position accuracy.

In the simplest approach, the location of each transmission point (e.g., subpanel 614) could be represented as a single vector with respect to an absolute reference point (e.g., reference point 630). However, it may be desirable to associate numerous base stations with the same reference point (e.g., reference point 630), so the reference point may be far from some base stations. It may also be desirable to represent the relative location of each subpanel with great precision. Thus, for a single reference point associated with multiple base stations, the assistance data would need to cover a large geographic range with small quantization (to represent the location of the subpanel with sufficient accuracy), which would require a large number of bits.

Accordingly, the present disclosure provides a multi-layer hierarchical structure for providing the location of a transmission point in assistance data to the UE. For example, as will be described in more detail below, at a high level, each cell identifier (ID) can be associated with a relative location with respect to the location of the base station, each PRS resource set (e.g., different panels 612 or different repeaters that are not co-located) of a cell ID can be associated with a relative location with respect to the location of the cell ID, and each PRS resource in the PRS resource set can be associated with a relative location with respect to the location of the PRS resource set (potentially a split of the panel into subpanels and creation of beams from a subset of antenna elements of a subpanel).

Referring back to FIG. 6, the center point 620 of the base station 602 is given as a vector A from the reference point 630, the center location of a cell 610 is given as a vector B from the relative location of the base station (i.e., center point 620), the center location of a panel 612 is given as a vector C from the relative location of the cell 610, and the center location of a subpanel 614 (or array of antenna elements) is given as a vector D from the relative location of the panel 612. As such, a UE may be provided with the location of a subpanel 614 by being provided with the coordinates of the reference point 630 and the vectors A, B, C, and D. If this level of positioning accuracy is not needed, the UE could be provided with the location of a panel 612 by being provided with the coordinates of the reference point 630 and the vectors A, B, and C. Each vector is considered a "layer" (or "level"), and as such, in this example, there are three or four layers of location granularity, as opposed to two layers (one for the base station and one for the cell) as described above.

In greater detail, the first level of description should be able to describe the location of any base station (e.g., gNB) in longitude and latitude. For example, the location of a base station may be represented as the coordinates of a reference point (e.g., reference point 630) and a relative distance and direction (e.g., vector A in FIG. 6) from that reference point. Alternatively, the location of a base station may be represented as the coordinates of the center of the base station (e.g., center point 620). At this level, there is no need for high precision, as the second level, the third level, and so on, will provide any desired additional precision. For example, the accuracy of the first level could be a radius of 9.25 m around the actual center of the base station.

A second level of description may correspond to, for example, a cell (e.g., a cell 610). The second level of description may be a vector (e.g., vector B in FIG. 6) representing the distance and direction from the reference point calculated from the first level of description to the center of the cell. As an example, the second level of description may provide an accuracy of 0.92 m around the actual center of the cell.

A third level of description may correspond to, for example, a PRS resource set. The third level of description may be a vector (e.g., vector C in FIG. 6) representing the distance and direction from the reference point calculated from the second level of description to the center of the transmission point of the PRS resource set (e.g., an antenna panel 612). As an example, the third level of description may provide an accuracy of 0.092 m around the actual center of the transmission point of the PRS resource set.

A fourth level of description may correspond to, for example, a PRS resource inside a PRS resource set. The fourth level of description may be a vector (e.g., vector D in FIG. 6) representing the distance and direction from the reference point calculated from the third level of description to the center of the transmission point of the PRS resource (e.g., a subpanel 614). The fourth level of description should have an accuracy range of less than one meter (e.g., 10 centimeters (cm)) and a very high precision (e.g., mm-level steps) to capture the location differences of different groups of antenna elements inside each panel. As an example, the fourth level of description may provide an accuracy of 0.0092 m around the actual center of the transmission point of the PRS resource.

In an aspect, a generic "RelativeLocation" information element (IE) can be defined that allows geodetic locations relative to a reference point with various granularities, together with a respective uncertainty. The above example values of 9.25 m, 0.92 m, 0.092 m, and 0.0092 m are based on proposed standardization. Specifically, granularities of 0.0003, 0.003, 0.03, and 0.3 seconds-of-angle have been proposed. These granularities correspond to approximately:

0.0003" ~$8.3 \times 10^{-8}$ degrees; approximately <0.0092 m
0.003" ~$8.3 \times 10^{-7}$ degrees; approximately <0.092 m
0.03" ~$8.3 \times 10^{-6}$ degrees; approximately <0.92 m
0.3" ~$8.3 \times 10^{-5}$ degrees; approximately <9.25 m Similarly, for the height resolution, units of meter, centimeter, and millimeter have been proposed.

In an aspect, if a lower level of description for a transmission point is not provided to the UE in assistance data, the UE can assume that the relative distance to the transmission point from the previous (higher) level is zero. That is, the UE can assume that the vector for that level is '0.' For example, if a second level is not provided, then the UE would assume that the relative difference with respect to the first level is '0.' Likewise, if a third level is not provided, then the UE would assume that the relative difference with respect to the second level is '0.'

As a specific example, with reference to FIG. 6, the first step would be to indicate the relative location of the base station 602 with respect to the absolute reference point 630. Vector A indicates this step, and the range (i.e., the length of vector A) would be expected to be large, and the precision could be coarse (further steps will improve resolution). As an example, a range of 20,480 m and a step size of 10 m would need 11 bits to represent vector A (i.e., ceil(log 2(20480 m/10 m))=11). The location of the base station 602 can be calculated based on the known location of the reference point 630 and the vector A.

A second step, represented by vector B in FIG. 6, provides the relative location of a cell 610 with respect to the location of the base station 602 calculated in the first step. That is, the location of a cell 610 can be calculated based on the known location of the reference point 630 and the vectors A and B. While some cells 610 may be mounted on towers, there are examples of cells 610 being mounted on the sides of buildings and other structures, resulting in a greater distance between the center of the structure and the cells mounted to the structure. As such, it may be desirable for the vector B to be able to represent a range of up to 256 m. An example range of 256 m and a step size of 1 m would need eight bits to represent vector B (i.e., ceil(log 2(256/1))=8). Note that the sum of vectors A and B (19 bits) would have a combined range of approximately 10 km and a precision of one meter.

A third step, represented by vector C in FIG. 6, provides the relative location of a panel 612 with respect to the location of a cell 610. That is, the location of a panel 612 can be calculated based on the known location of the reference point 630 and the vectors A, B, and C. Different panels 612 may be placed relatively close together, and therefore, it may be desirable for the vector C to represent an example range of up to 12.8 m with a step size of 10 cm. As such, vector C could be represented by seven bits (i.e., ceil(log 2(12.8/0.1))=7). The sum of vectors, A, B, and C would have a total range exceeding approximately 10 km and a precision of 10 cm.

A fourth step, indicated by vector D in FIG. 6, is to relate the position of a subpanel 614 with respect to the location of a panel 612. That is, the location of a subpanel 614 can be calculated based on the known location of the reference point 630 and the vectors A, B, C, and D. Due to the proximity of a subpanel 614 to the panel 612, it may be desirable for the vector D to represent an example range of up to 1.28 m with a step size of 1 cm. As such, vector D could be represented by seven bits (i.e., ceil(log 2(1.28/0.01))=7). After this step, the sum of vectors A, B, C, and D would have a range exceeding approximately 10 km with a precision of 1 cm.

In FIG. 6, there are a total of 18 subpanels 614, and using the hierarchy of vectors described above, the locations of all of these subpanels 614 can be represented by one vector A, three vectors B, nine vectors C, and 18 vectors D for a total of 224 bits (i.e., 1*11+3*8+9*7+18*7=224). That is, the locations of all 18 subpanels 614 can be represented by 224 bits. In contrast, if the location of each subpanel 614 is given as a vector from the reference point 630, then to achieve the same level of precision as the disclosed techniques, the locations of the 18 subpanels 614 would be represented by 378 bits (i.e., 18*ceil(log 2(20480/0.01))=18*21=378), which is an increase of 68.75% over the disclosed techniques. Thus, the present techniques provide a significant reduction in signaling overhead while providing highly accurate assistance data.

In an aspect, fixed ranges and step sizes, as in the example above, can be used. Alternatively, they could be variable, and their definition reported in the assistance data.

In an aspect, the disclosed method of reporting the location of a panel/subpanel may be used only for assistance data that is broadcasted to multiple UEs, and not for assistance data that is unicast to a single UE. Alternatively, it could be used only if the size of the broadcasted assistance data is larger than a threshold, or more than some threshold number of transmission points need to be reported to the UE.

In an aspect, a location server (e.g., location server 230, LMF 270) may provide the coordinates of antenna reference points (ARPs) for a set of TRPs in a "TRP-LocationInfo" IE. For each TRP, the ARP location can be provided for each associated PRS resource ID per PRS resource set. A "ReferencePoint" IE may be defined that may be an ellipsoid point with an altitude and uncertainty ellipsoid, or a high accuracy ellipsoid point with an altitude and uncertainty ellipsoid. A generic "RelativeLocation" IE may be defined that allows geodetic locations relative to a reference point with various granularities together with associated uncertainties. Granularities of 0.0003, 0.003, 0.03, and 0.3 seconds-of-angle have been proposed. As described above, these granularities correspond to approximately:

0.0003" ~$8.3 \times 10^{-8}$ degrees; approximately <0.0092 m
0.003" ~$8.3 \times 10^{-7}$ degrees; approximately <0.092 m
0.03" ~$8.3 \times 10^{-6}$ degrees; approximately <0.92 m
0.3" ~$8.3 \times 10^{-5}$ degrees; approximately <9.25 m Similarly, for the height resolution, units of meter, centimeter, and millimeter have been proposed.

Figure 7:
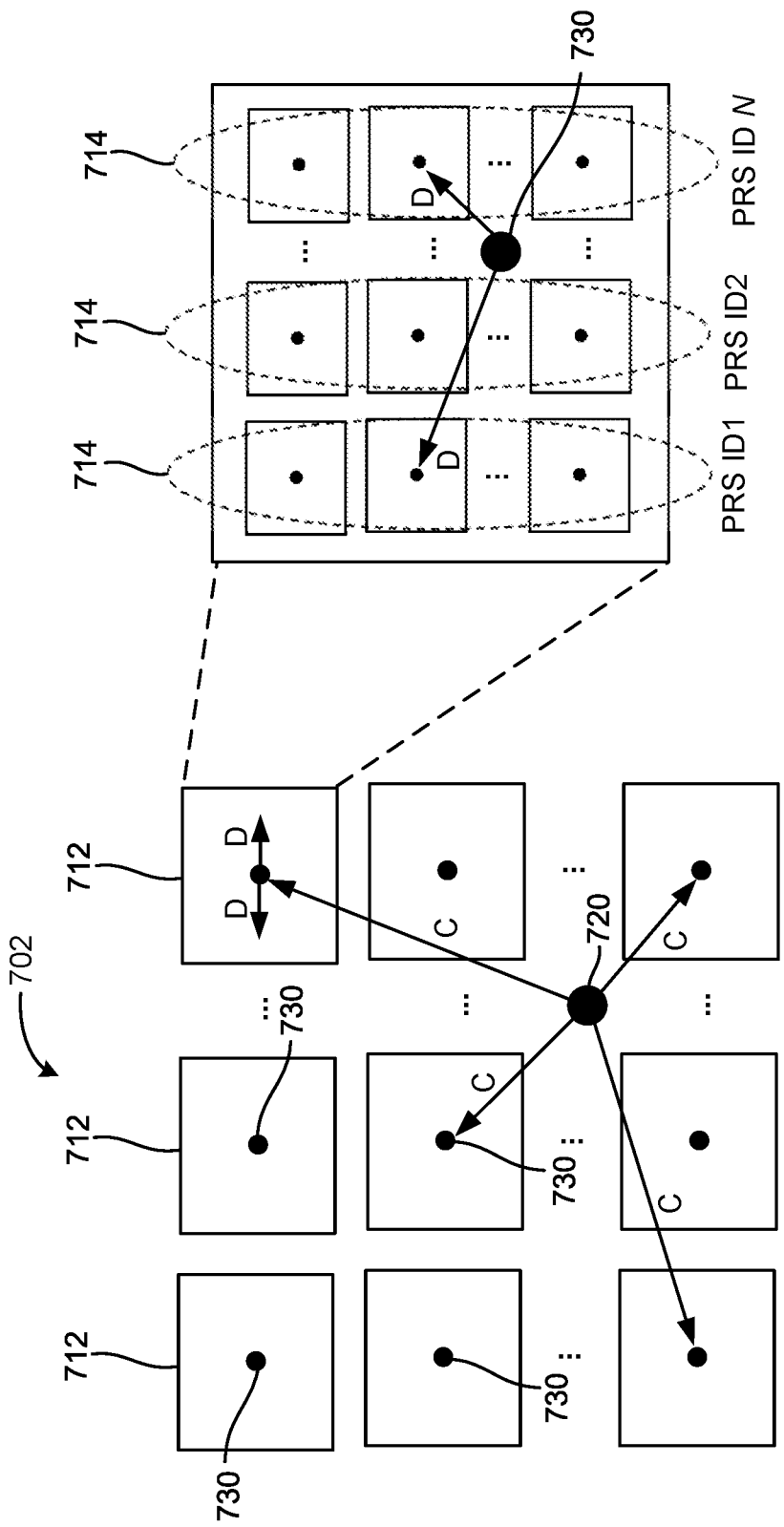
FIG. 7 illustrates another example of representing the distance between a transmission point on a base station and a UE, according to aspects of the disclosure.

FIG. 7 illustrates another example of representing the distance between a transmission point on a base station 702 and a UE, according to aspects of the disclosure. In the example of FIG. 7, a base station 702 has an array of some number of antenna panels 712. The array of antenna panels 712 may correspond to a single cell of the base station 702, such as cell 610 in FIG. 6. The center of the array of antenna panels 712 is represented as center point 720. FIG. 7 illustrates several vectors, labeled "C," that represent the distance between the center point 720 of the array of antenna panels 712 and the center points 730 of various antenna panels 712. These vectors may correspond to vector C illustrated in FIG. 6.

FIG. 7 further illustrates a more detailed view of one of the antenna panels 712. Each antenna panel 712 comprises an array of some number of antenna elements 714. Vertical groups, or columns, of antenna elements 714 may correspond to a particular transmit beam, and the PRS resources on each transmit beam may be labeled with a PRS ID (illustrated as "PRS ID1," "PRS ID2," and "PRS ID N"). The distance between the center point 730 of an antenna panel 712 and the center of a particular column of antenna elements 714 is labeled "D," and may correspond to vector D in FIG. 6. Thus, as can be seen, even beams that are transmitted from the same antenna panel 712 may not be transmitted from the same physical location on the x-axis of the antenna panel 712. For cases needing high-precision (e.g., centimeter-level accuracy), discrepancies on the order of centimeters between the actual location of the transmission point of a beam (e.g., a column of antenna elements 714) could result in noticeable, even significant, reductions in location accuracy. As such, being able to provide assistance data to a UE that represents the location of a column of antenna elements 714, as described herein, would be highly beneficial for precise positioning scenarios.

Figure 8:
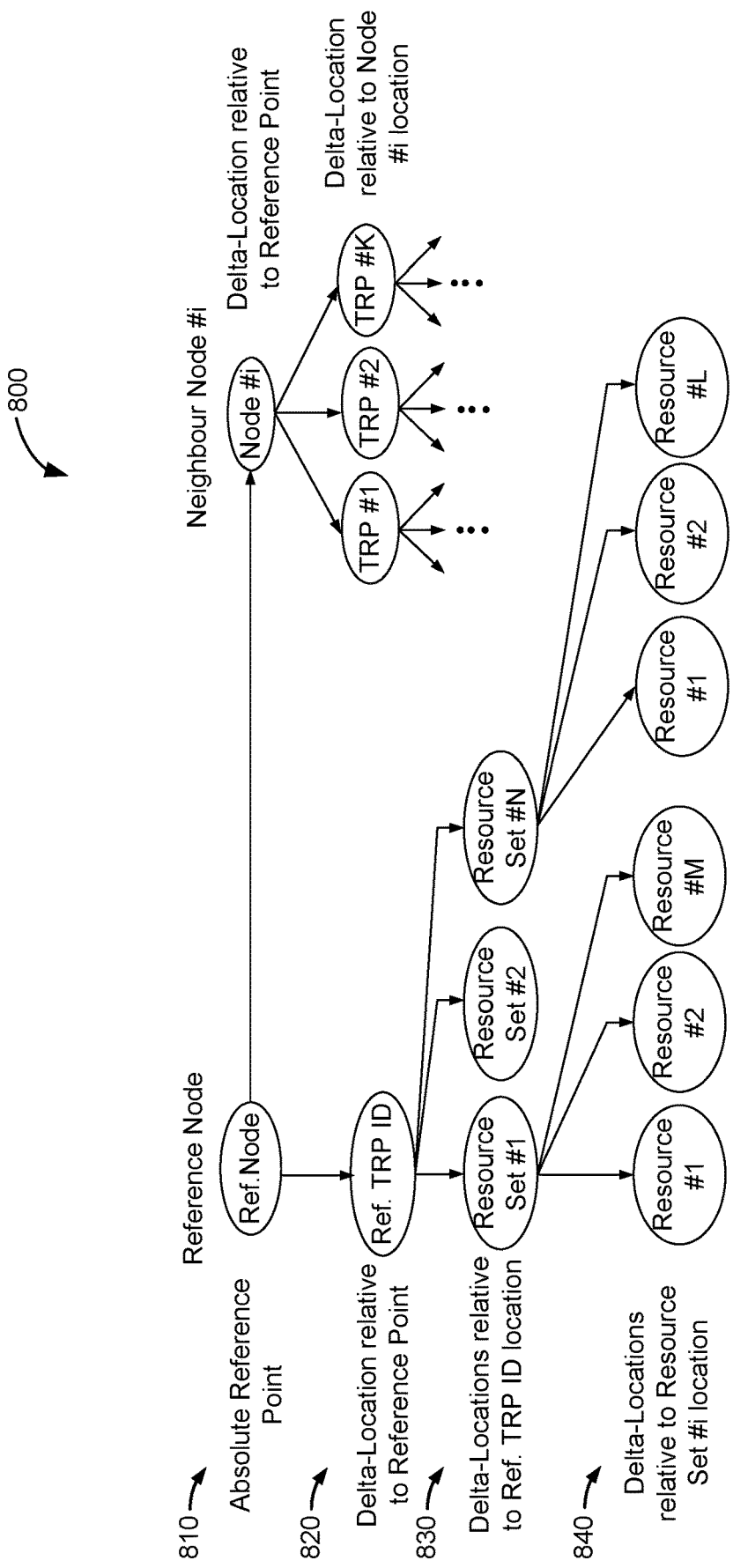
FIG. 8 illustrates a hierarchy of relative locations, according to aspects of the disclosure.

FIG. 8 illustrates a hierarchy 800 of relative locations, according to aspects of the disclosure. In FIG. 8, the hierarchy 800 includes a first level 810, which is an absolute reference point for the node (e.g., a reference node, such as a base station, for an RSTD positioning procedure). A second level 820 of hierarchy 800 defines the locations of TRPs (e.g., cells) of the node as delta locations relative to the reference point in the first level 810. A third level 830 defines the locations of PRS resource sets as delta locations relative to the location of the TRP ID in the second level 820. A fourth level 840 defines the locations of PRS resources as delta locations relative to the location of the PRS resource set in the third level 830.

In an aspect, a base station (or location server) may need to partially update a subset of the location information for a PRS resource (e.g., the location of a subpanel 614, column of antenna elements 714, fourth level 840). This may occur if the base station updates the actual beam in a PRS resource across occasions that are spaced out in time. For example, a PRS resource ID may be associated with a specific panel/subpanel in one positioning occasion, and after some seconds, the same PRS resource ID may be associated with a different one. To update the location information for the PRS resource without having to update the whole positioning protocol message containing the assistance data, the database storing the association between the PRS resource ID and cell ID and location may be updated without the need to update the remaining fields/values. That is, for example, only the vector D (and possibly the vector C if the panel has also changed) for the PRS resource would need to be provided to the UE, rather than all of vectors A, B, C, and D.

It should also be possible to update the location of a whole PRS resource set (e.g., third level 830), which would result in the change of all the locations of the PRS resources inside the PRS resource set, without having to send the assistance information for the PRS resources again. For example, the UE could be provided with a new vector C for the new location of the PRS resource set/panel, but the vectors D for the PRS resources/subpanels of the PRS resource set/panel would remain the same since the structure of the new panel is the same as the structure of the previous panel, and therefore, the locations of the PRS resources/subpanels relative the center of the PRS resource set/panel are the same. Similarly, it should be possible to update the location of the cell ID (e.g., second level 820) without a change needed in the assistance data for the location(s) of any related PRS resource set(s) (again assuming that the structure of the new cell is the same as the previous cell, and therefore, the relative positions of the PRS resource sets/panels is the same).

In an aspect, to update one or more levels of the hierarchy 800 independently of the other levels, there may be IEs dedicated to each layer of the hierarchy 800, and as such, the location server (or base station) can send a separate message that updates the IE for one of the layers without needing to send updated IEs for the layers that are above or below the involved layer.

In an aspect, it should be possible to configure a third level (e.g., third level 830) of relative locations (for PRS resource sets) that can be used across multiple cells (e.g., second level 820). For example, the relative location of a particular PRS resource set may be the same for some plurality of cell IDs. More specifically, with reference to FIG. 6, some set of cells 610 may have the same physical layout of panels 612 (corresponding to PRS resource sets). As such, vector C for a particular panel 612/PRS resource set will be the same across this set of cells 610. In this way, there is no need to repeat the same second layer relative locations for cells 610 that have the same physical structure.

Similarly, the fourth level 840 of relative locations (the PRS resource level) could be applied across multiple PRS resource sets or multiple cell IDs. For example, the relative location of a particular PRS resource may be the same for some plurality of panels 612 (PRS resource sets) and cells 610 (cell IDs). More specifically, some set of panels 612 may have the same physical layout of subpanels 614 (corresponding to PRS resources). As such, vector D for a particular subpanel 614 will be the same across this set of panels 612/cells 610. In this way, there is no need to repeat the same information across PRS resource sets when the relative positions of the PRS resources are the same.

In an aspect, for an on-demand PRS resource or PRS resource set, it should be possible to separately update just the physical locations of the transmission points without having to update any other related configuration parameters. For example, this would correspond to the case in which the same PRS resource is switched from one subpanel 614 to another subpanel 614, as during a beam sweep. In this scenario, the UE could be provided with the vectors A, B, and C, and then a new vector D for each time the PRS resource is switched from one subpanel 614 to the next. There would be no need to provide the vectors A, B, and C each time the PRS resource switches to a new subpanel, thereby further reducing the amount of assistance data provided to the UE.

In an aspect, if the relative location of a panel (or subpanel) is specified in a GCS framework (e.g., changes in the {x, y, z} axes relative to the center location of a panel given as {x', y', z'}), then the relative location of the panels (e.g., panels 612) may not be the same due to different panel orientations. That is, although the range and direction to the center of the panel represented by the vector C may be the same for each panel, if the panels are tilted, the beam direction will be different for different panels. To address this issue, (a) the panel orientation and the relative location can be specified in a local coordinate system (LCS), or (b) the GCS can still be used but polar coordinates {dr, theta, phi} can be provided for the relative location of the panel. In that case, the 'dr' may be the same, and only theta and phi would be different depending on which way the panel is facing. This information can be provided to the UE in the assistance data as an additional vector (e.g., a vector E).

In an aspect, a UE may not support all levels of the proposed hierarchy. For example, a UE may only support the first level (i.e., the location of the base station level), which means that each PRS resource inside the base station would be considered to have the same location. However, if a UE supports additional levels, or as a UE is upgraded to support additional levels, there would be no need to update the already deployed base station almanacs (BSAs), but rather, to simply provide the UE with the differential locations of the second and subsequent levels with respect to the first level. Thus, depending on UE capability, some UEs may only read the first level of a BSA and map it to their PRS resources, some other UEs may read the first level and adjust it with the second level and map it to the location of the PRS resources, and then some other UEs may have even better BSA location information (e.g., third and fourth levels).

Figure 9:
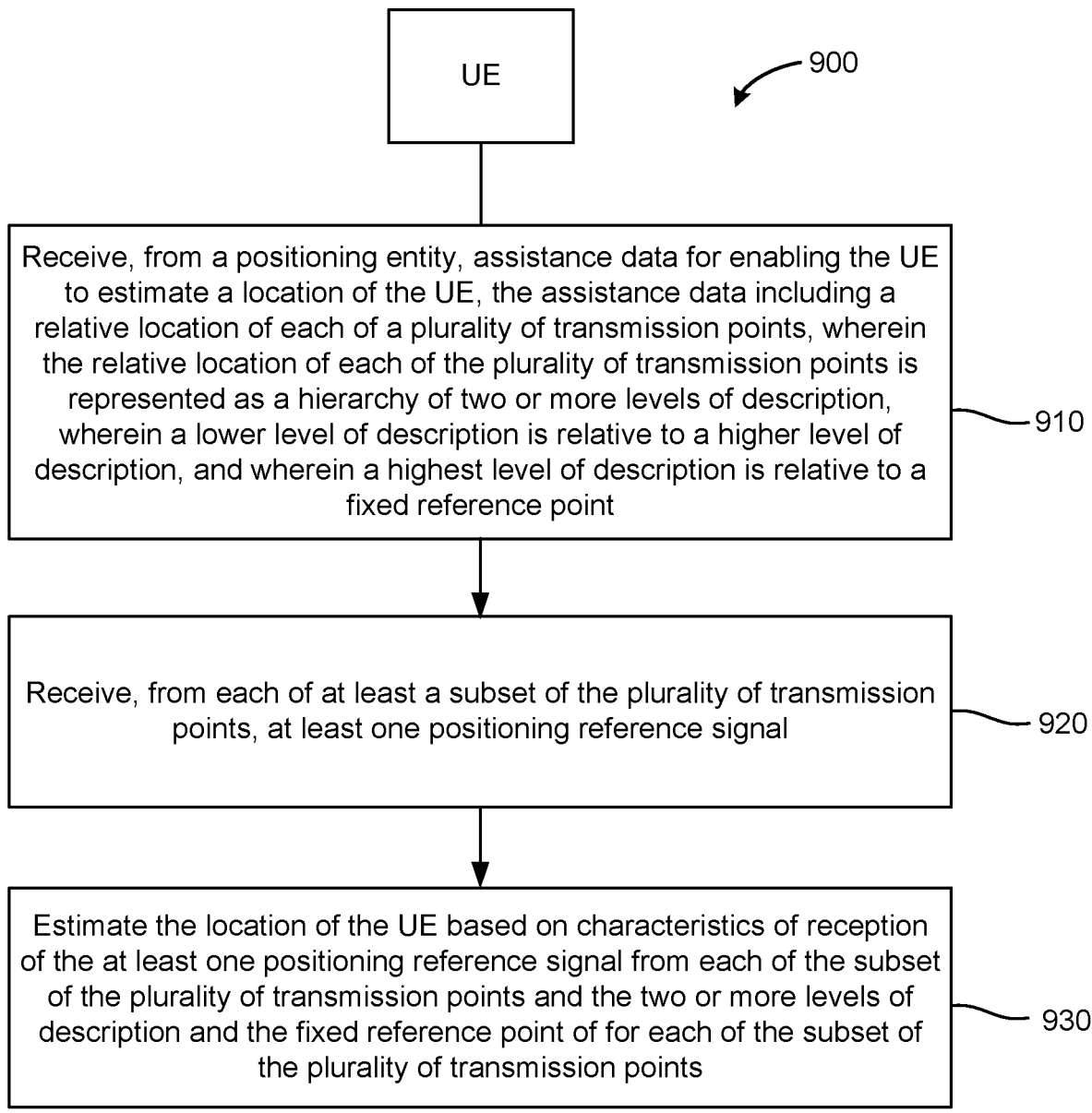
FIGS. 9 and 10 illustrate exemplary methods of wireless communication, according to aspects of the disclosure.

FIG. 9 illustrates an exemplary method 900 of wireless communication, according to aspects of the disclosure. In an aspect, the method 900 may be performed by a UE, such as any of the UEs described herein.

At 910, the UE receives, from a positioning entity (e.g., location server 230, LMF 270), assistance data for enabling the UE to estimate a location of the UE, the assistance data including a relative location of each of a plurality of transmission points (e.g., subpanels 614, panels 612, etc.), wherein the relative location of each of the plurality of transmission points is represented as a hierarchy of two or more levels of description (e.g., vectors A, B, C, D; levels 810 to 840), wherein a lower level of description is relative to a higher level of description, and wherein a highest level of description (e.g., vector A; first level 810) is relative to a fixed reference point (e.g., reference point 630). In an aspect, operation 910 may be performed by WWAN transceiver 310, processing system 332, memory component 340, and/or assistance data component 342, any or all of which may be considered "means" for performing this operation.

At 920, the UE receives, from each of at least a subset of the plurality of transmission points, at least one positioning reference signal. In an aspect, operation 920 may be performed by WWAN transceiver 310, processing system 332, memory component 340, and/or assistance data component 342, any or all of which may be considered "means" for performing this operation.

At 930, the UE estimates the location of the UE based on characteristics of reception of the at least one positioning reference signal from each of the subset of the plurality of transmission points and the two or more levels of description and the fixed reference point for each of the subset of the plurality of transmission points. In an aspect, operation 940 may be performed by WWAN transceiver 310, processing system 332, memory component 340, and/or assistance data component 342, any or all of which may be considered "means" for performing this operation.

Figure 10:
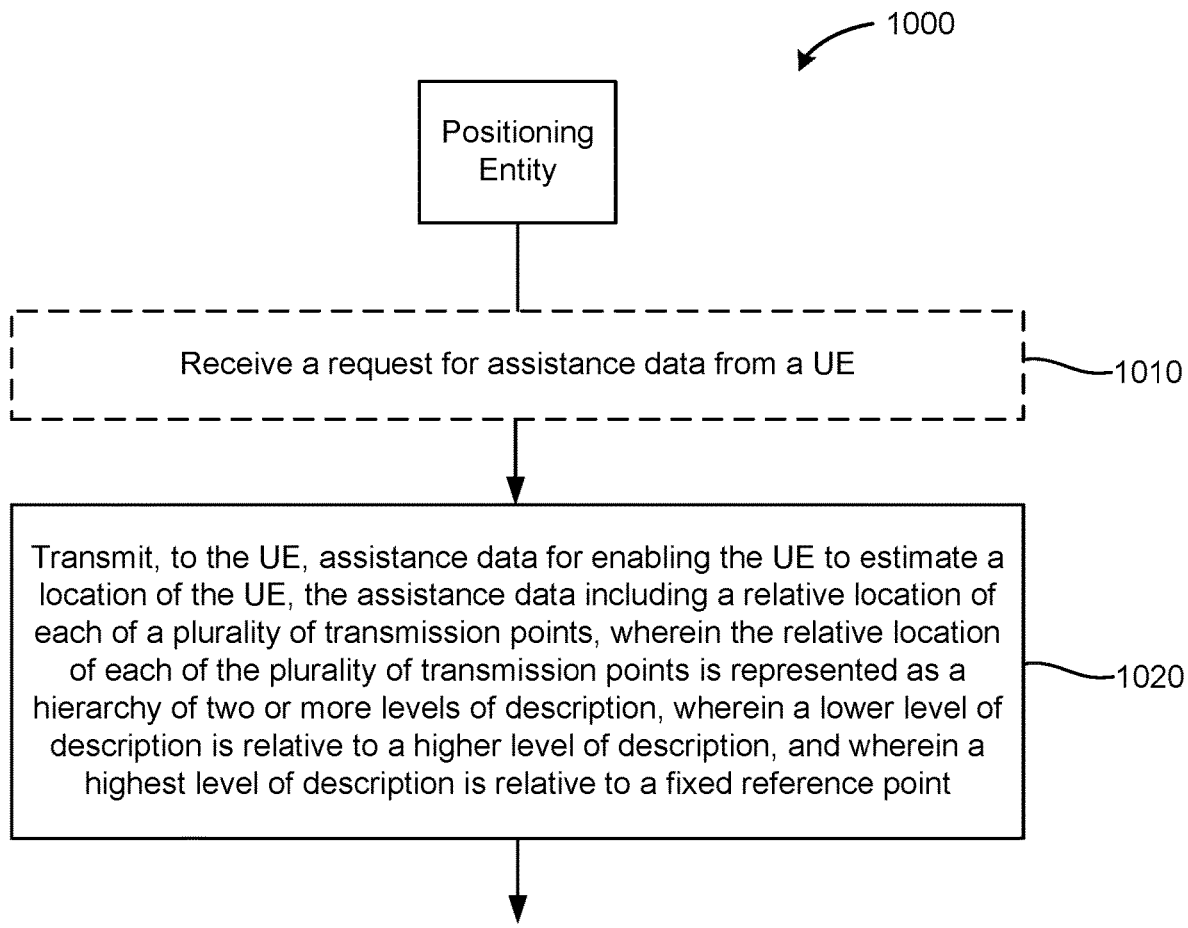

FIG. 10 illustrates an exemplary method 1000 of wireless communication, according to aspects of the disclosure. In an aspect, the method 1000 may be performed by a positioning entity, such as a location server (e.g., location server 230, LMF 270) or a serving base station (e.g., any of the base stations described herein).

At 1010, the positioning entity optionally receives a request for assistance data from a UE (e.g., any of the UEs described herein). In an aspect, where the positioning entity is a base station, operation 1010 may be performed by WWAN transceiver 350, processing system 384, memory component 386, and/or assistance data component 388, any or all of which may be considered "means" for performing this operation. In an aspect, where the positioning entity is a location server, operation 1010 may be performed by network interface(s) 390, processing system 394, memory 396, and/or assistance data component 398, any or all of which may be considered "means" for performing this operation.

At 1020, the positioning entity transmits assistance data for enabling the UE to estimate a location of the UE, the assistance data including a relative location of each of a plurality of transmission points (e.g., subpanels 614, panels 612, etc.), wherein the relative location of each of the plurality of transmission points is represented as a hierarchy of two or more levels of description (e.g., vectors A, B, C, D; levels 810 to 840), wherein a lower level of description is relative to a higher level of description, and wherein a highest level of description (e.g., vector A; first level 810) is relative to a fixed reference point (e.g., reference point 630). In an aspect, where the positioning entity is a base station, operation 1010 may be performed by WWAN transceiver 350, processing system 384, memory component 386, and/or assistance data component 388, any or all of which may be considered "means" for performing this operation. In an aspect, where the positioning entity is a location server, operation 1010 may be performed by network interface(s) 390, processing system 394, memory 396, and/or assistance data component 398, any or all of which may be considered "means" for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
receiving, from a positioning entity, assistance data for enabling the UE to estimate a location of the UE, the assistance data including a relative location of each of a plurality of transmission points, wherein the relative location of each of the plurality of transmission points is represented by coordinates of a fixed reference point and a plurality of vectors, wherein the plurality of vectors define two or more levels of description, wherein, for each transmission point, a first level of description of the two or more levels of description represents a location of a transmission-reception point (TRP) relative to the fixed reference point, and a second level of description of the two or more levels of description represents a location corresponding to a positioning reference signal (PRS) resource set relative to the location corresponding to the TRP;

estimating the location of the UE based on characteristics of reception of at least one positioning reference signal from each of a subset of the plurality of transmission points and the plurality of vectors and the fixed reference point for each of the subset of the plurality of transmission points.

2. The method of claim 1, wherein a lower level of description is relative to a higher level of description, and wherein a highest level of description is relative to a fixed reference point.

3. The method of claim 2, wherein, based on a lower level of the two or more levels of description not being provided in the assistance data, the UE treats the lower level as being equal to zero.

4. The method of claim 1, wherein the plurality of transmission points corresponds to a plurality of PRS resource sets.

5. The method of claim 1, wherein, for each transmission point:
a third level of description of the two or more levels of description representing the relative location of the transmission point represents a location corresponding to a PRS resource relative to the location corresponding to the PRS resource set.

6. The method of claim 5, wherein the plurality of transmission points corresponds to a plurality of PRS resources.

7. The method of claim 1, wherein the characteristics of reception comprise a round-trip-time (RTT) estimate or a reference signal time difference (RSTD) measurement between reference signals received from pairs of transmission points, angle information, or any combination thereof.

8. The method of claim 1, wherein the positioning entity comprises: a location server.

9. The method of claim 1, wherein the positioning entity comprises: a location management function.

10. A user equipment (UE), comprising:
one or more memories a memory;
one or more transceivers; and
one or more processors communicatively coupled to the one or more memories and the one or more transceivers, the one or more processors configured to:
receive, via the one or more transceivers, from a positioning entity, assistance data for enabling the UE to estimate a location of the UE, the assistance data including a relative location of each of a plurality of transmission points, wherein the relative location of each of the plurality of transmission points is represented by coordinates of a fixed reference point and a plurality of vectors, wherein the plurality of vectors define two or more levels of description, wherein, for each transmission point, a first level of description of the two or more levels of description represents a location of a transmission-reception point (TRP) relative to the fixed reference point, and a second level of description of the two or more levels of description represents a location corresponding to a positioning reference signal (PRS) resource set relative to the location corresponding to the TRP;
estimate the location of the UE based on characteristics of reception of at least one positioning reference signal from each of a subset of the plurality of transmission points and the plurality of vectors and the fixed reference point for each of the subset of the plurality of transmission points.

11. The UE of claim 10, wherein a lower level of description is relative to a higher level of description, and wherein a highest level of description is relative to a fixed reference point.

12. The UE of claim 11, wherein, based on a lower level of the two or more levels of description not being provided in the assistance data, the UE treats the lower level as being equal to zero.

13. The UE of claim 10, wherein the plurality of transmission points corresponds to a plurality of PRS resource sets.

14. The UE of claim 10, wherein, for each transmission point:
a third level of description of the two or more levels of description representing the relative location of the transmission point represents a location corresponding to a PRS resource relative to the location corresponding to the PRS resource set.

15. The UE of claim 14, wherein the plurality of transmission points corresponds to a plurality of PRS resources.

16. The UE of claim 10, wherein the characteristics of reception comprise a round- trip-time (RTT) estimate or a reference signal time difference (RSTD) measurement between reference signals received from pairs of transmission points, angle information, or any combination thereof.

17. The UE of claim 10, wherein the positioning entity comprises: a location server.

18. The UE of claim 10, wherein the positioning entity comprises: a location management function.

19. A user equipment (UE), comprising:
means for receiving, from a positioning entity, assistance data for enabling the UE to estimate a location of the UE, the assistance data including a relative location of each of a plurality of transmission points, wherein the relative location of each of the plurality of transmission points is represented by coordinates of a fixed reference point and a plurality of vectors, wherein the plurality of vectors define two or more levels of description, wherein, for each transmission point, a first level of description of the two or more levels of description represents a location of a transmission-reception point (TRP) relative to the fixed reference point, and a second level of description of the two or more levels of description represents a location corresponding to a positioning reference signal (PRS) resource set relative to the location corresponding to the TRP; and
means for estimating the location of the UE based on characteristics of reception of at least one positioning reference signal from each of a subset of the plurality of transmission points and the plurality of vectors and the fixed reference point for each of the subset of the plurality of transmission points.

20. The UE of claim 19, wherein a lower level of description is relative to a higher level of description, and wherein a highest level of description is relative to a fixed reference point.

21. The UE of claim 20, wherein, based on a lower level of the two or more levels of description not being provided in the assistance data, the UE treats the lower level as being equal to zero.

22. The UE of claim 19, wherein the plurality of transmission points corresponds to a plurality of PRS resource sets.

23. The UE of claim 19, wherein, for each transmission point:
a third level of description of the two or more levels of description representing the relative location of the transmission point represents a location corresponding to a PRS resource relative to the location corresponding to the PRS resource set.

24. The UE of claim 23, wherein the plurality of transmission points corresponds to a plurality of PRS resources.

25. The UE of claim 19, wherein the characteristics of reception comprise a round- trip-time (RTT) estimate or a reference signal time difference (RSTD) measurement between reference signals received from pairs of transmission points, angle information, or any combination thereof.

26. The UE of claim 19, wherein the positioning entity comprises: a location server.

27. A non-transitory computer-readable medium storing computer- executable instructions that, when executed by a user equipment (UE), cause the UE to:
receive, from a positioning entity, assistance data for enabling the UE to estimate a location of the UE, the assistance data including a relative location of each of a plurality of transmission points, wherein the relative location of each of the plurality of transmission points is represented by coordinates of a fixed reference point and a plurality of vectors, wherein the plurality of vectors define two or more levels of description, wherein, for each transmission point, a first level of description of the two or more levels of description represents a location of a transmission- reception point (TRP) relative to the fixed reference point, and a second level of description of the two or more levels of description represents a location corresponding to a positioning reference signal (PRS) resource set relative to the location corresponding to the TRP; and
estimate the location of the UE based on characteristics of reception of at least one positioning reference signal from each of a subset of the plurality of transmission points and the plurality of vectors and the fixed reference point for each of the subset of the plurality of transmission points.

* * * * *